Dec. 7, 1948.  H. B. JAYNES  2,455,494
ELECTRICALLY OPERATED GENERATOR
Filed Nov. 24, 1947  2 Sheets-Sheet 1
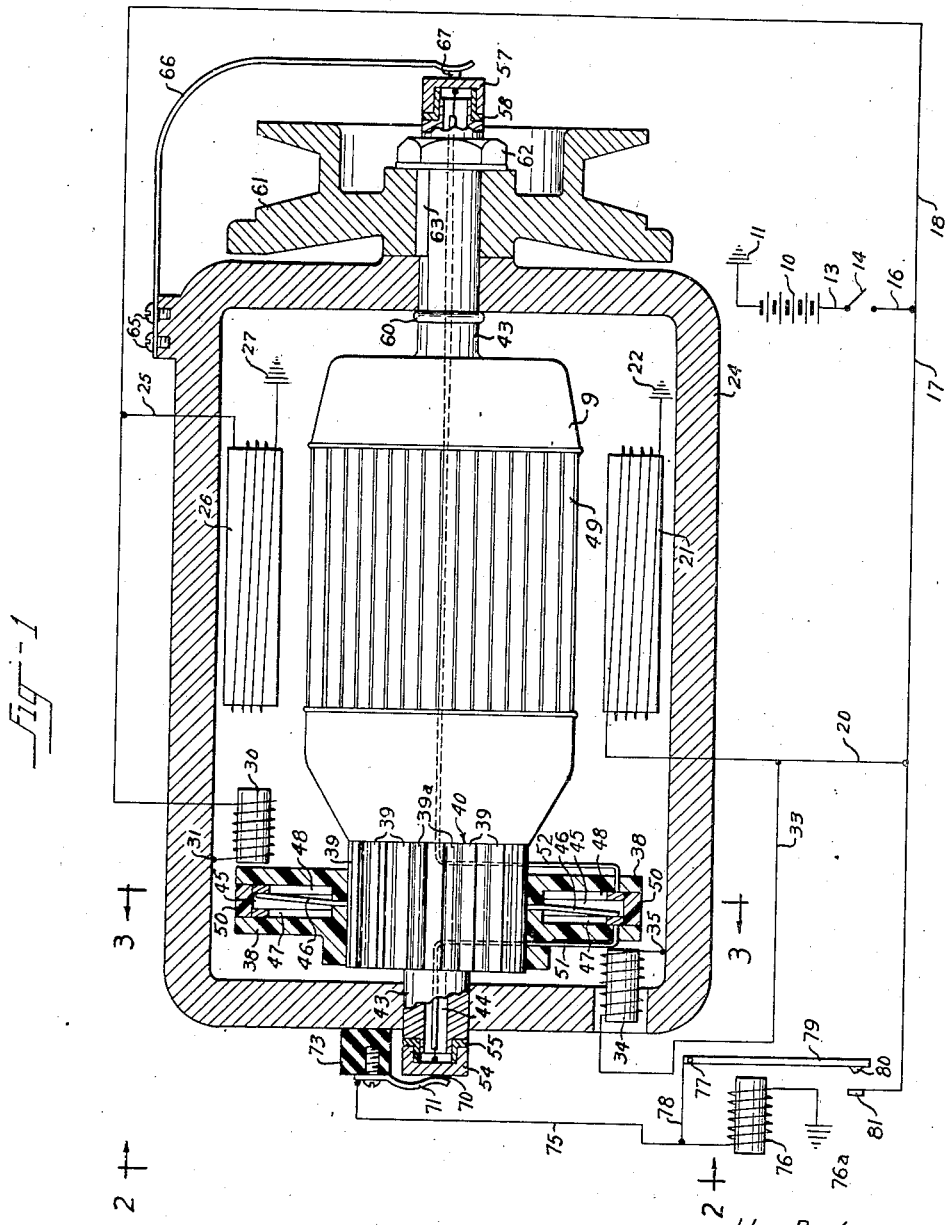
HAL B. JAYNES,
Inventor.
By
Attorney Dec. 7, 1948.　　　　　H. B. JAYNES　　　　2,455,494
ELECTRICALLY OPERATED GENERATOR
Filed Nov. 24, 1947　　　　　　　　　　　　2 Sheets-Sheet 2

Hal B. Jaynes,
Inventor.

By　　　　　　Attorney

Patented Dec. 7, 1948

2,455,494

UNITED STATES PATENT OFFICE 2,455,494

ELECTRICALLY OPERATED GENERATOR

Hal B. Jaynes, Lenoir, N. C.

Application November 24, 1947, Serial No. 787,719

2 Claims. (Cl. 171—228)

My invention consists of certain improvements in generators and electric motors, and relates more especially to the arcing at the commutator of a generator and at the armature of electric motors. Heretofore generators or electric motors have had brushes which contacted the peripheral surface of the armature.

It is an object of my invention to eliminate the brushes used and to eliminate the necessity for replacing the same when they have become worn and to provide a means whereby a much smaller brush may be utilized and the same will cover such a limited area in comparison to the original type of brush that wear to the same will be very slight in comparison.

Some of the objects of the invention having been stated, other objects will appear as the description proceeds when taken in connection with the accompanying drawings, in which Figure 1 is a vertical sectional view of a commutator generator with some parts being shown schematically;

Figure 3:
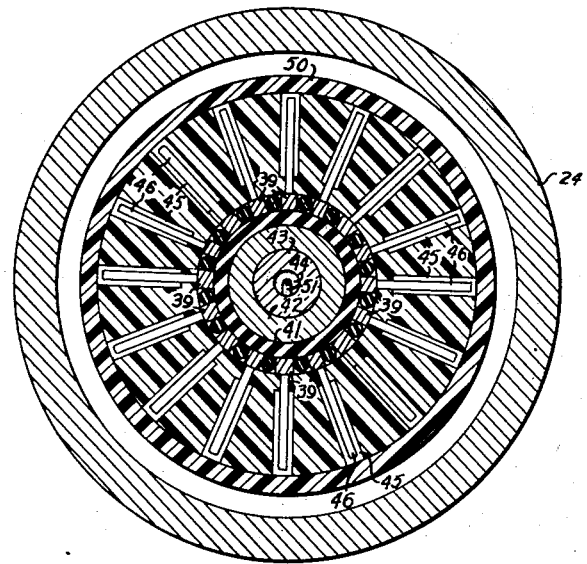
Figure 3 is a vertical sectional view taken along the line 3—3 in Figure 1.
Figure 2:
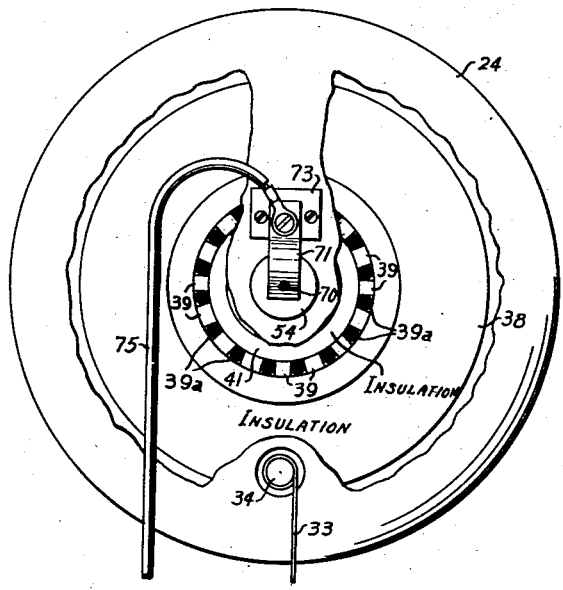
Figure 2 is a view taken along the line 2—2 in Figure 1 with parts broken away.

Referring more specifically to the drawings, the numeral 10 indicates a storage battery which is grounded as at 11 and has a wire 13 leading therefrom to one side of a switch 14. Leading from the other side of the switch 14 is a wire 16 which is connected to a wire 17 and a wire 18. The wire 17 has a branch wire 20 leading therefrom to a field coil 21 which is grounded as at 22 to a generator housing 24.

The wire 18 has a branch wire 25 leading therefrom to another field coil 26 which is grounded as at 27 to the generator housing 24. The free end of the wire 18 extends beyond the wire 25 and through the housing 24 to a magnetic coil 30 which is grounded as at 31 to the housing 24. The wire 20 at the lower side of Figure 1 has connected thereto a wire 33 which extends to a magnetic coil 34 which is grounded as at 35 to the generator housing 24.

Mounted adjacent the coil 34 is a ring 38 of any non-conductive material, such as plastic, and this ring is fixedly secured such as by pressing in place, to a ring of commutator bars 39 which are integral with a commutator 40.

The commutator bars 39 are secured to and mounted on an insulation ring 41 secured on a metal core 42 fixedly secured on a shaft 43 having a hole 44 therethrough.

The ring 38, which is pressed onto the commutator bars 39, has a plurality of slots 45 therein in which are mounted for free movement at their outer ends a plurality of metal fingers 46 which are imbedded in the center portions of the ring 38 and pass through this center portion and each of the fingers 46 contacts one of the commutator bars 39.

Adjacent the remote ends of the fingers 46 within the ring 38 are contact rings 47 and 48 which are secured to the opposite walls of the inside of the ring 38. On the exterior surfaces of the rings 47 and 48 is an annular ring 50 which is pressed into place to thereby prevent any air from entering the area in which the contact rings are confined. The contact rings 47 and 48 have leading therefrom wires 51 and 52 respectively which extend inwardly to the center of the shaft 43 and turn in opposite directions from each other and proceed along the hole 44 to the remote ends of the shaft 43.

The wire 51 is connected to a metal disc 54 which is secured to an insulation collar 55 which is fixedly mounted on the end of the shaft 43. The wire 52 is connected to a disc 57 which is fixedly mounted on an insulation member 58 secured on the other end of the shaft 43. The shaft 43 is mounted near each end in the housing 24 and has a snap ring 60 on the inside surface of the housing 24 and on the outside surface of the housing 24 adjacent the ring 60 is a V-pulley 61 which is secured to the shaft 43 by a bolt 62 and is keyed by a key 63 to the shaft 43 and thus lateral movement of the shaft 43 is prevented.

Secured at one end of the housing 24 remote from the ring 38 by means of screws 65 is a leaf spring member 66 which extends downwardly to the center of the shaft 43 and has at its lower end a brush 67 which contacts the center of the disc 57. At the opposite end of the shaft 43 the disc 54 is contacted by a brush 70 which is secured to a leaf spring member 71. The leaf spring member 71 is secured to an insulation block 73 which is secured to the housing 24.

Since the leaf spring member 66 is secured directly to the housing 24, it thus provides a ground for the wire 52 to the disc 57 while at the opposite end of the housing 24 a wire 75 is connected to the leaf spring member 71 and extends to a magnetic relay coil 76. The coil 76 is grounded as at 76a. The wire 75 has connected thereto a branch wire 78 which extends to near the pivot point 77 of an arm 79 which has a contact point 80 integral therewith which, when drawn downwardly by the magnetic coil 76 engages a contact 81 at the free end of the wire 17.

The commutator bars 39 are connected in a conventional manner to the bars 49 of a conventional rotor 9.

The commutator bars 39 are separated by suitable insulation members 39a.

Method of operation

As power rotates the V-pulley 61 thus turning the shaft 43, the plastic ring 38 is also caused to rotate. At this time, the switch 14 being closed, the current runs from the battery 10 through the wires 17, 20 and 33 to the magnetic coil 34 which is grounded as at 35 and at the same time, on the other hand, the current is also proceeding from the battery 10 through the switch 14 through the wires 16 and 18 and thence to the other magnetic coil 30 which is grounded as at 31. The rotation of the ring 38 will cause the remote fingers 46 to be drawn in step by step relation to the magnetic coils 30 and 34 simultaneously.

Since the rotor 9 is rotating between the two field coils 21 and 26 which are energized from the current furnished from the battery 10 through the wires 17 and 20 to the coil 21 and through the wires 18 and 25 to the coil 26, a current is set up in the commutator member 40. This, of course, transmits the current to the commutator bars 39 and current passes through the fingers 46 to the rings 47 and 48 and current then passes from the rings 47 and 48 through the wires 51 and 52 and to the opposite ends of the shaft 43.

The current is completed from the wire 52 through the disk 57 through the brush 67 and thence through the leaf spring member 66 where it is grounded. The current from the wire 51 is completed by passing through the contact disk 54, through the brush 70 and through the leaf spring member 71 mounted on the insulation block 74 on the end of the housing 24. The current then passes through the wire 75 to the coil 76 and the current is grounded at 76a to thus draw the bar 79 by magnetism downwardly or to the left in Figure 1 to thus contact the contact points 80 and 81 and thus complete the circuit through the wire 17, through wire 16, and switch 14 and wire 13 to the battery 10 grounded at 11.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In an electrical generator having a housing and a driven rotor mounted in said housing and a plurality of field coils disposed in spaced relation to the rotor, said rotor having a commutator thereon provided with a plurality of spaced commutator bars insulated from each other, an insulation ring mounted on the commutator bars and having a closed cavity extending entirely therearound, a pair of conducting rings mounted on opposed sides of said cavity, a plurality of metallic fingers mounted in said ring and having the outer ends thereof disposed between the two conducting rings and having their inner ends in engagement with the commutator bars, the commutator and rotor being mounted on a shaft, said shaft having a longitudinally extending bore therethrough, a wire connected to one of the metallic rings and extending longitudinally in the bore of the said shaft to one end of the shaft and a brush contacting the end of the wire and grounded to the housing, a second wire connected to the other ring and extending in the opposite direction in said bore in said shaft to the other end of said shaft and having a brush contacting the same, a source of energy connected to the two field coils, a pair of magnetic coils disposed 180 degrees apart and on opposed sides of said ring mounted on the commutator and said source of current being connected to said last-named coils and being grounded after passing through the coils, a vibrator coil secured to the last-named brush and having its other end grounded and an oscillatable member also connected to the last-named wire and having a contact on its free end and a fixed contact disposed adjacent the last-named contact and connected to said source of energy, whereby upon rotation being imparted to the rotor and commutator, two oppositely directed metallic fingers will be attracted simultaneously by said coils located 180 degrees apart to alternately contact their free ends against the said metallic rings disposed within said insulating ring.

2. In a generator comprising a housing and a hollow shaft mounted in said housing and having a longitudinally extending bore from one end to the other, a rotor mounted on said shaft and a commutator having a plurality of spaced commutator bars thereon insulated from each other, a plurality of stator coils mounted in said housing and in spaced relation to the rotor, an insulating ring mounted on the commutator bars and having an annular cavity therein, a pair of metallic rings mounted on opposed sides of said annular cavity, a plurality of metallic fingers mounted in said insulating ring and having one end in engagement with the commutator bars and having the other ends disposed between the metallic conducting rings disposed within said insulating ring, a source of current connected to said stator coils and grounded at the other ends of said stator coils, a pair of magnetic coils disposed on opposed sides of the insulating ring and connected at one side to the source of current and grounded at the other side, a wire leading from each of the metallic rings disposed within the insulating ring to opposed ends of said shaft, means grounding the wire at one end of the shaft, a brush member contacting the wire at the other end of the shaft, means connecting said magnetic coils to a source of current at one end and grounding the same at the other end, a wire leading from the last-named brush, a magnetic coil connected at one end to said last-named wire and grounded at the other end, a vibrating switch mounted in spaced relation to the last-named magnetic coil, whereby when rotation is imparted to said shaft, the pair of magnetic coils will be energized to simultaneously ground the metallic fingers mounted in said insulating ring.

HAL B. JAYNES.

No references cited.